United States Patent
Wennersten et al.

(10) Patent No.: US 12,549,729 B2
(45) Date of Patent: Feb. 10, 2026

(54) BLOCK IMPORTANCE MAPPING

(71) Applicant: Telefonaktiebolaget LM Ericsson (publ), Stockholm (SE)

(72) Inventors: Per Wennersten, Årsta (SE); Christopher Hollmann, Uppsala (SE); Jacob Ström, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 282 days.

(21) Appl. No.: 18/278,161

(22) PCT Filed: Apr. 7, 2022

(86) PCT No.: PCT/SE2022/050353
§ 371 (c)(1),
(2) Date: Aug. 21, 2023

(87) PCT Pub. No.: WO2022/220722
PCT Pub. Date: Oct. 20, 2022

(65) Prior Publication Data
US 2024/0129469 A1 Apr. 18, 2024

Related U.S. Application Data

(60) Provisional application No. 63/174,080, filed on Apr. 13, 2021.

(51) Int. Cl.
*H04N 19/124* (2014.01)
*H04N 19/117* (2014.01)
(Continued)

(52) U.S. Cl.
CPC ......... *H04N 19/124* (2014.11); *H04N 19/117* (2014.11); *H04N 19/172* (2014.11);
(Continued)

(58) Field of Classification Search
CPC .. H04N 19/124; H04N 19/117; H04N 19/172; H04N 19/176; H04N 19/1883; H04N 19/65; H04N 19/80
See application file for complete search history.

(56) References Cited

U.S. PATENT DOCUMENTS 6,731,685 B1    5/2004 Liu et al.
10,708,624 B1 *  7/2020 Saeedi .................. H04N 19/50
(Continued)

FOREIGN PATENT DOCUMENTS

EP    3675500 A1    7/2020
EP    3923242 A1    12/2021
(Continued)

OTHER PUBLICATIONS

Yeo et at., "On Rate Distortion Optimization Using SSIM", IEEE Transactions on Circuits and Systems for Video Technology, vol. 23, No. 7, Jul. 2013, pp. 1170-1181 (12 pages).
(Continued)

*Primary Examiner* — David F Dunphy
(74) *Attorney, Agent, or Firm* — ROTHWELL, FIGG, ERNST, & MANBACK, P.C.

(57) ABSTRACT

There is provided a method for encoding a picture. The method comprises, for each picture on either side of the current picture with a distance of one or two away from the current picture, computing a first error value, E, wherein the first error value, E, is computed for each block of a set of blocks of a first block size of the current picture and is based on the respective block of the current picture and a corresponding block in the picture. The method comprises, for each picture on either side of the current picture with a distance of one or two away from the current picture, aggregating the first error value, E, over a block of a second block size for each block of the set of blocks of the first block size contained in the block of the second block size to
(Continued)

generate a second error value, E', corresponding to the picture. The method further comprises computing an importance score for the block of the second block size in the current picture based at least in part on the second error value, E', corresponding to one or more of the pictures on either side of the current picture with a distance of one or two away from the current picture. The method comprises computing a change in quantization parameter, QP, value for the block of the second block size in the current picture based on the importance score. The method comprises signaling the change in QP value to an encoder.

17 Claims, 6 Drawing Sheets

(51) Int. Cl.
- H04N 19/169 (2014.01)
- H04N 19/172 (2014.01)
- H04N 19/176 (2014.01)
- H04N 19/65 (2014.01)
- H04N 19/80 (2014.01)

(52) U.S. Cl.
CPC ....... *H04N 19/176* (2014.11); *H04N 19/1883* (2014.11); *H04N 19/65* (2014.11); *H04N 19/80* (2014.11)

(56) References Cited

U.S. PATENT DOCUMENTS

| | | |
|---|---|---|
| 2013/0022108 A1 | 1/2013 | Panusopone |
| 2015/0016501 A1 | 1/2015 | Guo et al. |

FOREIGN PATENT DOCUMENTS

| | | |
|---|---|---|
| EP | 3934254 A1 | 1/2022 |
| JP | 2008099175 A | 4/2008 |
| JP | 2010-541386 A | 12/2010 |
| WO | 2009/045683 A1 | 4/2009 |

OTHER PUBLICATIONS

Gao et al., "Source Distortion Temporal Propagation Analysis for Random-Access Hierarchical Video Coding Optimization", IEEE Transactions on Circuits and Systems for Video Technology, vol. 29, No. 2, Feb. 2019, pp. 546-559 (14 pages).

Wennersten et al., "[AHG10] GOP-based temporal filter improvements", Joint Video Experts Team (JVET) of ITU-T SG 16 WP 3 and 1S0/IEC JTC 1/SC 29, JVET-U0056, 21st Meeting, by teleconference, Jan. 6-15, 2021 (4 pages).

Wennersten et al., "[AHG10] Block importance mapping", Joint Video Experts Team (JVET) of ITU-T SG 16 WP 3 and ISO/IEC JTC 1/SC 29, JVET-V0057, 22nd Meeting, by teleconference, Apr. 20-28, 2021 (3 pages).

Wennersten et al., "[AHG10] Block importance mapping", Joint Video Experts Team (JVET) of ITU-T SG 16 WP 3 and 1S0/IEC JTC 1/SC 29, JVET-Y0077-vl, 25th Meeting, by teleconference, Jan. 12-21, 2022 (4 pages).

Xie et al., "Temporal Dependent Bit Allocation Scheme for Rate Control in HEVC ", IEEE, 2015 (6 pages).

International Search Report and Written Opinion dated Apr. 29, 2022 issued in International Patent Application No. PCT/SE2022/050353 (14 pages).

P. Wennersten et al., "[AHG10] Block importance mapping", Joint Video Experts Team (JVET) of ITU-T SG 16 WP 3 and ISO/IEC JTC 1/SC 29, JVET-v0057-v3, 22nd Meeting, Apr. 20-28, 2021 (4 pages).

\* cited by examiner

BLOCK IMPORTANCE MAPPING

CROSS REFERENCE TO RELATED APPLICATIONS

This application is a 35 U.S.C. § 371 National Stage of International Patent Application No. PCT/SE2022/050353, filed Apr. 7, 2022, which claims priority to U.S. Provisional Patent Application No. 63/174,080, filed on Apr. 13 2021, the disclosures of which are incorporated herein in their entirety by reference.

TECHNICAL FIELD

This disclosure relates to coding and decoding of video sequences and/or still images, and more particularly, to block importance mapping.

BACKGROUND

The first step when coding video is to code a still picture. Then, a future picture is coded that can use that picture for prediction. Next, a picture is coded that can use either of the previously coded pictures for prediction. This kind of hierarchical coding is a fundamental feature of modern video codecs.

Because of the hierarchical coding, it is more important to code certain pictures in high quality, because these will be used for predicting several future pictures and thereby impact the quality of the dependent pictures as well.

Traditionally, this is done by setting different Quantization Parameter (QP) values for pictures at different hierarchical levels. A low QP gives high quality and high bitrate, and a high QP gives low bitrate and low quality.

In practice, the optimal QP values will depend on how similar different pictures are to each other. If a video consists of almost identical pictures, it is best to use a very low QP (resulting in high quality) for the first picture. At the other extreme, if there is no similarity between pictures, they should all have the same QP. Because of this, algorithms exist that try to find good QP values based on the pictures to be coded. In fact, rather than simply setting a single QP value for each picture, different parts of the picture can have different QP values. This is useful to, e.g., code a static background at a lower QP than a rapidly changing foreground.

One such algorithm is described in "A novel macroblock-tree algorithm for high-performance optimization of dependent video coding in H.264/AVC," Jason Garret-Glaser. Briefly, the first step is to go through all the pictures in a video, estimate which area in a previous picture they will predict from, if any. After that, the algorithm essentially sets the importance of all blocks to 1, then goes through the video backwards and adds each block's importance to any blocks it predicts from. Importance will thus accumulate down the hierarchy leaving the first frame as the most important. After that, a formula is used to translate importance to QP.

SUMMARY

Several real-life encoders do not have a good solution for dynamically selecting QP values. When they do, several of the algorithms for doing so rely on a slow pre-encoding pass which tries to determine all the future pictures where information from the current picture is likely to be used.

Embodiments herein provide an algorithm for selecting good QP-values based on calculations already being done in an encoder's temporal filter. Rather than consider all future pictures which might reference the current picture, embodiments estimate future importance based on a subset of neighboring pictures, e.g., on only four neighboring pictures.

According to a first aspect of the present disclosure, there is provided a method for encoding a picture. The method comprises, for each picture on either side of the current picture with a distance of one or two away from the current picture, computing a first error value, E, wherein the first error value, E, is computed for each block of a set of blocks of a first block size of the current picture and is based on the respective block of the current picture and a corresponding block in the picture. The method comprises, for each picture on either side of the current picture with a distance of one or two away from the current picture, aggregating the first error value, E, over a block of a second block size for each block of the set of blocks of the first block size contained in the block of the second block size to generate a second error value, E', corresponding to the picture. The method further comprises computing an importance score for the block of the second block size in the current picture based at least in part on the second error value, E', corresponding to one or more of the pictures on either side of the current picture with a distance of one or two away from the current picture. The method comprises computing a change in quantization parameter, QP, value for the block of the second block size in the current picture based on the importance score. The method comprises signaling the change in QP value to an encoder.

According to a second aspect of the present disclosure, there is provided a computer program comprising instructions which when executed by processing circuitry of an encoder, causes the encoder to perform the method according to the first aspect.

According to a third aspect of the present disclosure, there is provided a carrier containing the computer program according to the second aspect, wherein the carrier is one of an electronic signal, an optical signal, a radio signal, and a computer readable storage medium According to a fourth aspect, there is provided an encoder configured to encode a picture according to the first aspect.

Embodiments share calculations with a temporal filter, and decide to change QP based on those calculations, both of which are improvements to the state of the art. Because embodiments reuse computations from an existing temporal filter, the complexity impact of the disclosed adaptive QP algorithm is negligible. At the same time, the bitrate of coded video can be reduced by almost 2% on average in some embodiments, while maintaining the same visual quality.

BRIEF DESCRIPTION OF THE DRAWINGS

The accompanying drawings, which are incorporated herein and form part of the specification, illustrate various embodiments.

DETAILED DESCRIPTION

Embodiments provide an algorithm for determining QP involving calculating a difference between pictures. In some embodiments, this is based on difference calculations already performed in a temporal filter. In hierarchical coding the pictures are typically divided into temporal layers, where lowest temporal layer includes the intra-picture, and where the highest temporal layer typically only contains pictures that are not used for reference. Embodiments may modify QP only for pictures where the temporal filter is active, which is generally the lowest three layers of the temporal hierarchy.

Figure 1:
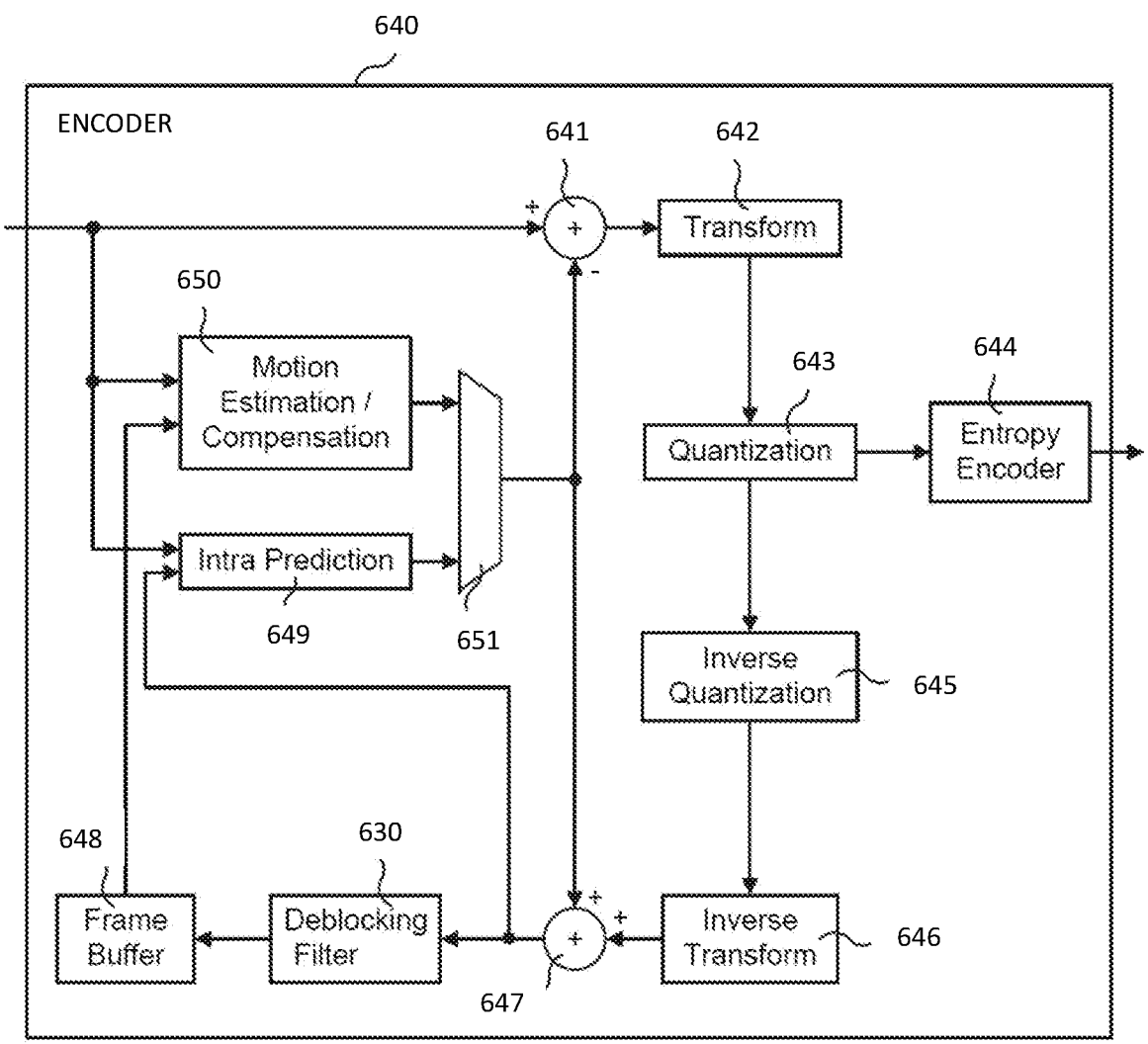
FIG. 1 is an example architecture of an encoder according to an embodiment.
Figure 2:
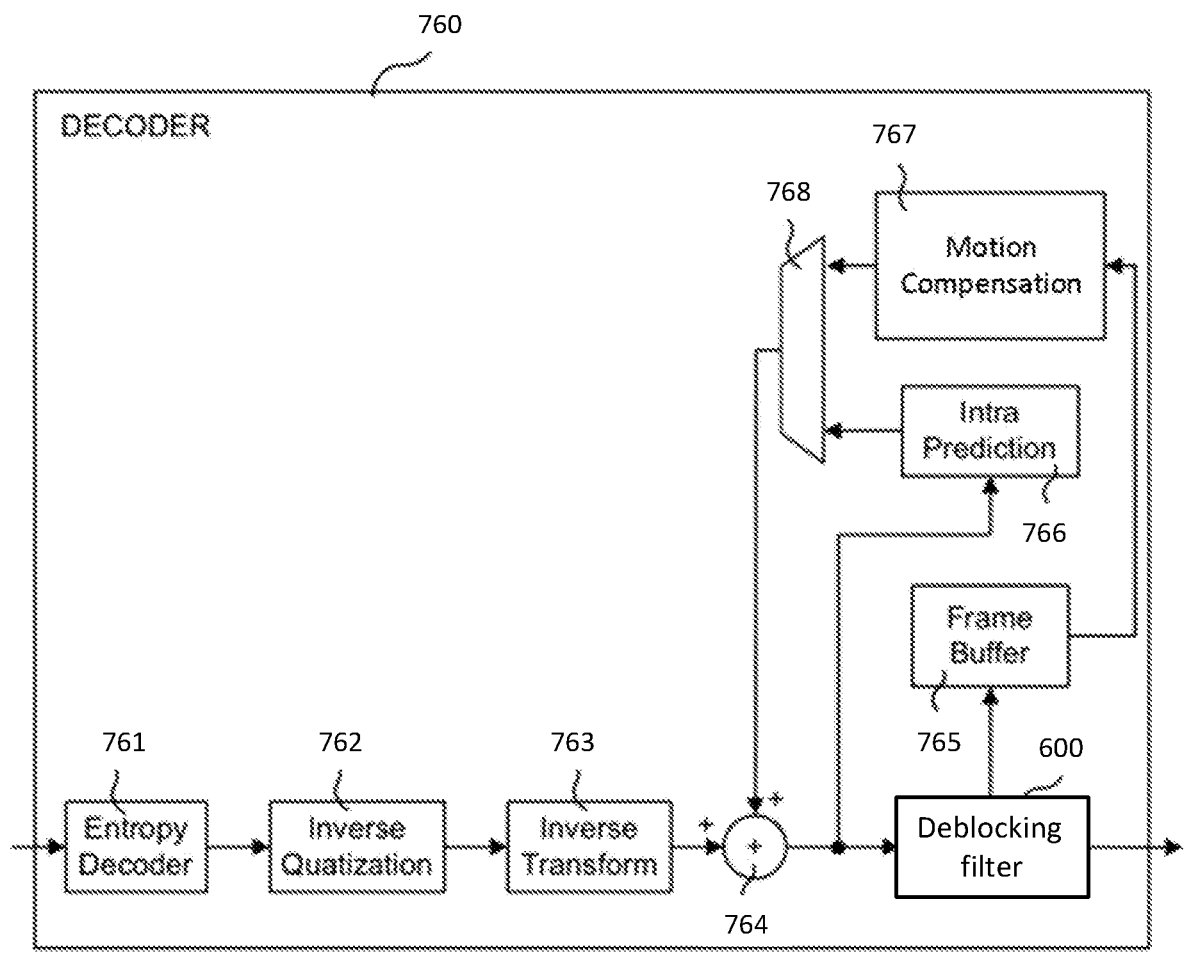
FIG. 2 is an example architecture of a decoder according to an embodiment.

An exemplary encoder is shown in FIG. 1. An exemplary decoder is shown in FIG. 2.

Figure 3:
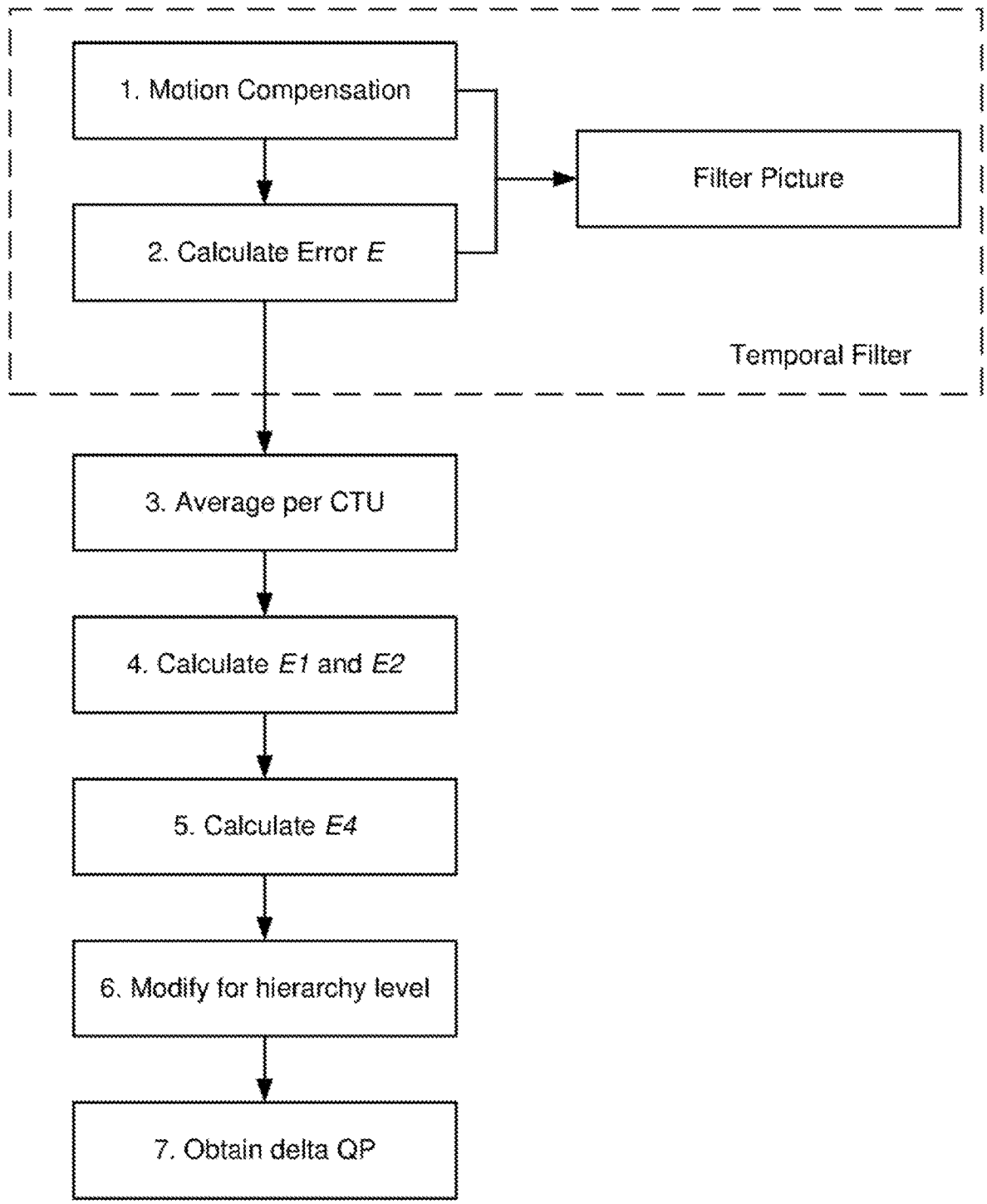
FIG. 3 illustrates a flow chart according to an embodiment.

FIG. 3 illustrates an exemplary algorithm according to an embodiment.

After motion compensation for a given block (e.g., an 8×8 block), such as shown in step 1 of FIG. 1, the temporal filter computes the variance of the original block and the sum of squared differences (SSD) between the original block and the corresponding block in the reference picture after motion compensation. Based on this, an error E is computed, such as shown in step 2 of FIG. 3. The error E may in embodiments be computed as:

$$E = 0.2 \cdot \frac{SSD+5}{V+5} + \frac{SSD}{3200}$$

where V refers to the computed variance and SSD refers to computed SSD.

This formula will give a low E-value (i.e., high importance) to blocks that have a low SSD value, as well as a low relative error (SSD/variance).

The E-value is computed per block (e.g., 8×8 block) for each reference picture in the temporal filter.

Next, the average E-value in a Coding Tree Unit (CTU) (e.g., 128×128 pixels), here denoted E', is calculated for the pictures immediately before and after the current picture (e.g., two pictures on either side of the current picture), as shown in step 3 of FIG. 3. The average E-value, i.e., the E'-value may be computed, for example, by a simple averaging over the sub-blocks in the CTU (e.g. over the 256 8×8 blocks in the CTU).

For a given CTU, the two E'-values for pictures a distance of one on either side of the current picture are averaged to form a value E1, and the two E-values for pictures a distance of two on either side of the current picture are averaged to form a value E2, such as shown in step 4 of FIG. 3. These error values (E1 and E2) may be extrapolated to yield an E4 value for each CTU, such as shown in step 5 of FIG. 3. In embodiments, E4 may be computed as:

$$E4 = \max(E1, E2) + \text{abs}(E2-E1)*3$$

The E4 value is designed to take into account how quickly the importance fades. If E1 indicates high importance, but E2 indicates low importance, the importance evaporates quickly, and the block is not so important to encode well. However, if both E1 and E2 signal the same level of importance, this indicates that the importance stays for longer and it is more important to code the block well.

The temporal filter typically does not filter all frames, but only frames belonging to the lowest temporal layers. For the highest temporal layer among these, i.e., for the highest temporal layer that is filtered, E4 may be modified, as shown in step 6 of FIG. 3. For example, E4 may be modified as:

$$E4 = 0.6*E4 + 0.4*66$$

This sets the importance closer to medium importance to compensate for these pictures being used as reference for fewer future pictures.

Finally, a thresholding is performed to decide a delta QP for each CTU, as shown in step 7 of FIG. 3. For example, a delta QP may be computed based on a table such as:

| E4 | delta QP |
| --- | --- |
| 0-22 | −2 |
| 23-41 | −1 |
| 42-76 | 0 |
| 77-101 | +1 |
| >102 | +2 |

The delta QP above is simply added to the picture QP to determine the final QP for the CTU. The delta QP value may be signaled using the existing mechanisms within the standard.

Figure 4:
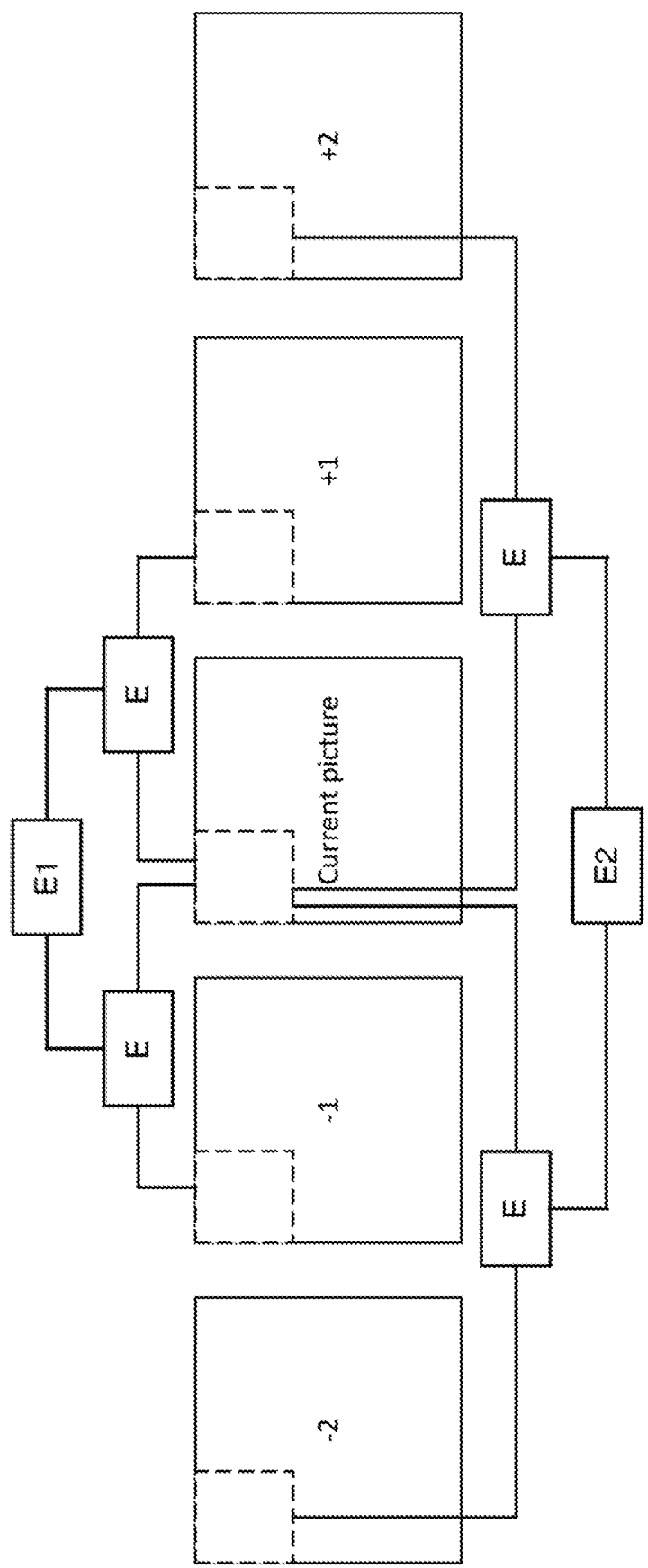
FIG. 4 illustrates an error calculation according to an embodiment.

FIG. 4 illustrates the error calculation according to an embodiment. An error E' is calculated, e.g., as part of the temporal filtering, with respect to the current picture and a nearby picture at a block level (e.g. for each CTU). As shown, there is an error E for each of the pictures ±1 and ±2 away from the current picture, and an average E1 of the error E' for the pictures ±1 away from the current picture and another average E2 of the error E' for the pictures ±2 away from the current picture.

Figure 5:
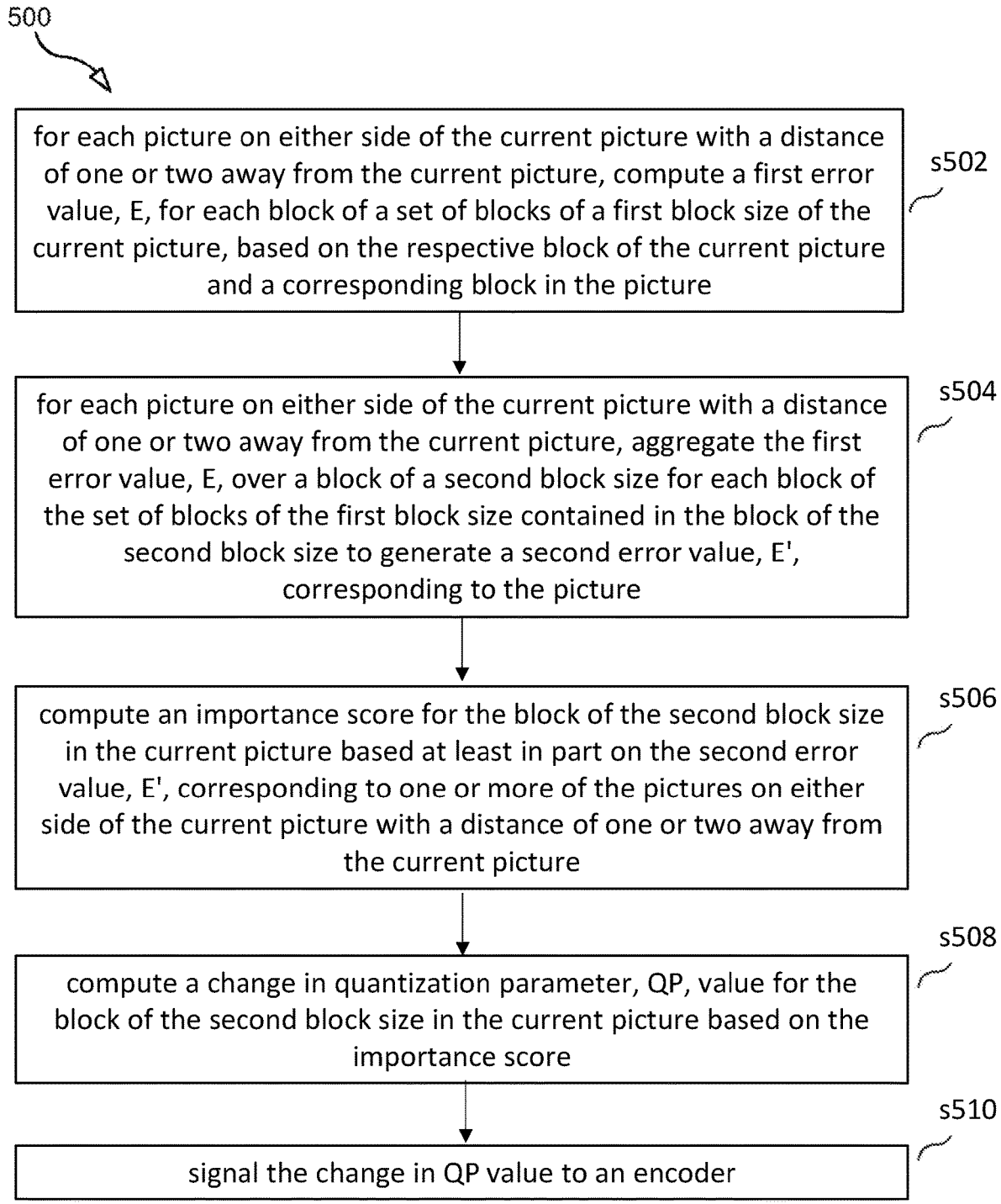
FIG. 5 is a flow chart according to an embodiment.

FIG. 5 illustrates a flow chart according to an embodiment. Process 500 is a method for encoding a picture. The method may begin with step s502.

Step s502 comprises, for each adjacent picture of a set of pictures adjacent to a current picture, computing a first error value (E), wherein the first error value (E) is computed for each block of a set of blocks of a first block size of the current picture and is based on the respective block of the current picture and a corresponding block in the adjacent picture.

Step s504 comprises, for each adjacent picture of the set of pictures adjacent to the current picture, aggregating the first error value (E) over a block of a second block size for each block of the set of blocks of the first block size contained in the block of the second block size to generate a second error value (E') corresponding to the adjacent picture.

Step s506 comprises computing an importance score for the block of the second block size in the current picture based at least in part on the second error value (E') corresponding to one or more of the pictures adjacent to the current picture.

Step s508 comprises computing a change in quantization parameter (QP) value for the block of the second block size in the current picture based on the importance score.

Step s510 comprises signaling the change in QP value to an encoder.

In some embodiments, computing the first error value (E) is performed during a temporal filtering. In some embodiments, aggregating the first error value (E) over the block of the second block size for each block of the first block size contained in the block of the second block size to generate a second error value (E') corresponding to the adjacent picture comprises averaging the first error value (E) for each block of the first block size contained in the block of the second block size. In some embodiments, the block of the second block size comprises a coding tree unit (CTU). In some embodiments, the first error value (E) for a block of the first block size is based on a variance V of the block and a sum-of-squared-differences (SSD) between the block and the corresponding block in the adjacent picture. In some embodiments, the first error value (E) for a block of the first block size is calculated by $$E = a \cdot \frac{SSD + b}{V + c} + \frac{SSD}{d}$$

where a, b, c, and d are parameters.

In some embodiments, the method further includes aggregating the second error value (E') corresponding to adjacent pictures a distance of one away from the current pictures to generate a third error value (E1). The method further includes aggregating the second error value (E') corresponding to adjacent pictures a distance of two away from the current pictures to generate a fourth error value (E2). The method further includes calculating a fifth error value (E4) based on the third error value (E1) and the fourth error value (E2). Computing an importance score for the block of the second block size in the current picture is based at least in part on the fifth error value (E4). In some embodiments, aggregating the second error value (E') corresponding to adjacent pictures a distance of one away from the current pictures to generate a third error value (E1) comprises averaging the second error value (E') corresponding to adjacent pictures a distance of one away from the current pictures to generate a third error value (E1) and wherein aggregating the second error value (E') corresponding to adjacent pictures a distance of two away from the current pictures to generate a fourth error value (E2) comprises averaging the second error value (E') corresponding to adjacent pictures a distance of two away from the current pictures to generate a fourth error value (E2).

In some embodiments, calculating a fifth error value (E4) based on the third error value (E1) and the fourth error value (E2) comprises computing E4=max(E1,E2)+abs(E2−E1)*A where A is a parameter. In some embodiments, the fifth error value (E4) is modified based on a layer of the temporal filtering. In some embodiments, for the highest temporal layer that contains pictures that undergo temporal filtering, the fifth error value (E4) is modified as E4: =x*E4+y, where x and y are parameters. In some embodiments, the change in QP value is one of {−2, −1, 0, +1, +2}.

Figure 6:
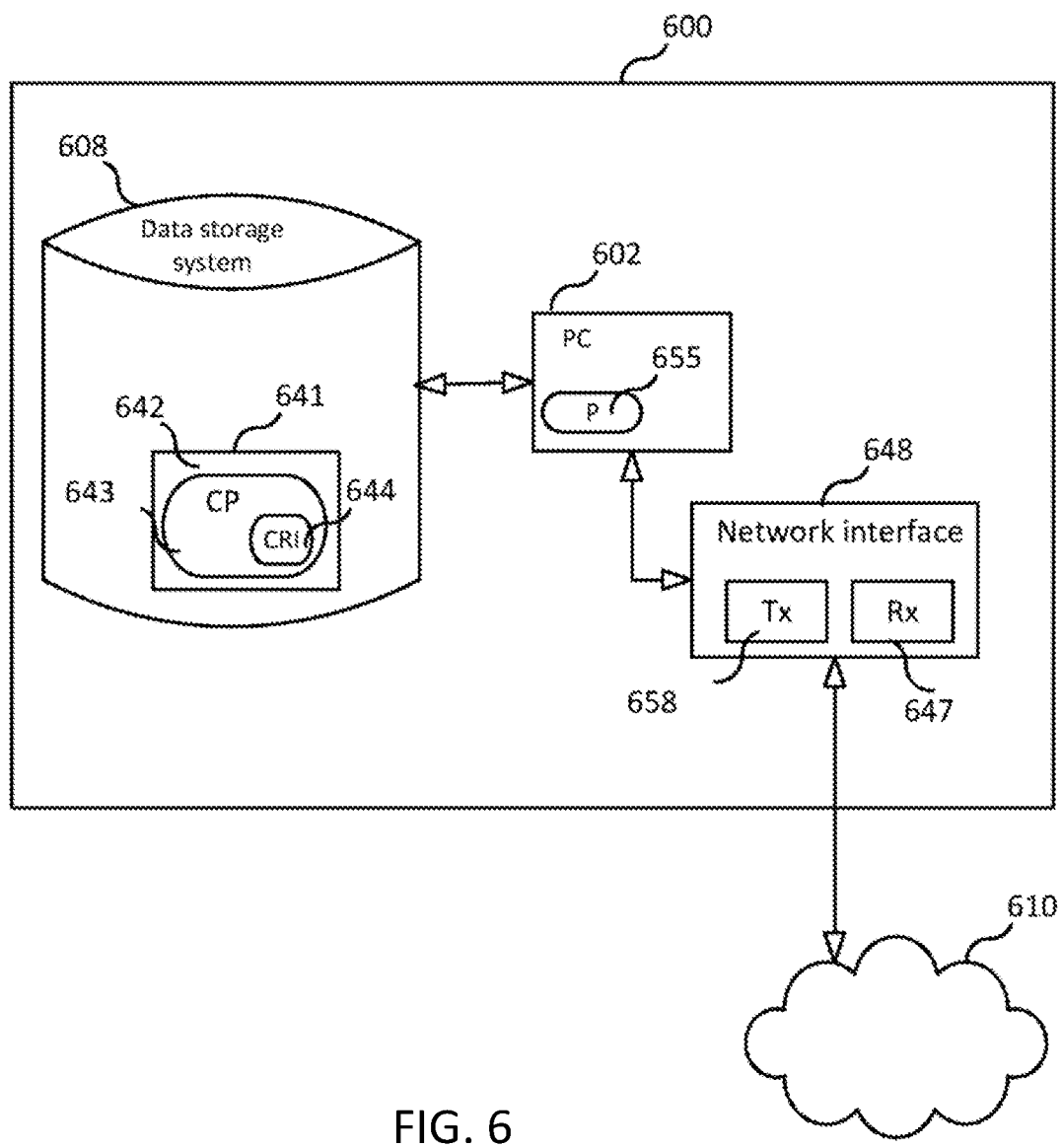
FIG. 6 is a block diagram of an encoder according to an embodiment.

FIG. 6 is a block diagram of node 600 (e.g., an encoder or decoder), according to some embodiments. As shown in FIG. 6, node 600 may comprise: processing circuitry (PC) 602, which may include one or more processors (P) 655 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., node 600 may be a distributed computing apparatus); at least one network interface 648 (e.g., a physical interface or air interface) comprising a transmitter (Tx) 645 and a receiver (Rx) 647 for enabling node 600 to transmit data to and receive data from other nodes connected to a network 610 (e.g., an Internet Protocol (IP) network) to which network interface 648 is connected (physically or wirelessly) (e.g., network interface 648 may be coupled to an antenna arrangement comprising one or more antennas for enabling node 600 to wirelessly transmit/receive data); and a local storage unit (a.k.a., "data storage system") 608, which may include one or more non-volatile storage devices and/or one or more volatile storage devices. In embodiments where PC 602 includes a programmable processor, a computer program product (CPP) 641 may be provided. CPP 641 includes a computer readable medium (CRM) 642 storing a computer program (CP) 643 comprising computer readable instructions (CRI) 644. CRM 642 may be a non-transitory computer readable medium, such as, magnetic media (e.g., a hard disk), optical media, memory devices (e.g., random access memory, flash memory), and the like. In some embodiments, the CRI 644 of computer program 643 is configured such that when executed by PC 602, the CRI causes node 600 to perform steps described herein (e.g., steps described herein with reference to the flow charts). In other embodiments, node 600 may be configured to perform steps described herein without the need for code. That is, for example, PC 602 may consist merely of one or more ASICs. Hence, the features of the embodiments described herein may be implemented in hardware and/or software.

As used herein, a network element, node, or subsystem (e.g., an encoder or decoder) may be comprised of one or more pieces of service network equipment, including hardware and software that communicatively interconnects other equipment on a network (e.g., other network elements, end stations, etc.), and is adapted to host one or more applications or services, either in a virtualized/non-virtualized environment, with respect to a plurality of subscribers and associated user equipment (UE) nodes that are operative to receive/consume content in a media distribution network where media content assets may be distributed and delivered using stream-based or file-based mechanisms. As such, some network elements may be disposed in a wireless radio network environment whereas other network elements may be disposed in a public packet-switched network infrastructure, including or otherwise involving suitable content delivery network (CDN) infrastructure that may comprise public, private, or mixed CDNs. Further, suitable network elements including one or more embodiments set forth herein may involve terrestrial and/or satellite broadband delivery infrastructures, e.g., a Digital Subscriber Line (DSL) network architecture, a Data Over Cable Service Interface Specification (DOCSIS)-compliant Cable Modem Termination System (CMTS) architecture, switched digital video (SDV) network architecture, a Hybrid Fiber-Coaxial (HFC) network architecture, a suitable satellite access network architecture or a broadband wireless access network architecture over cellular and/or WiFi connectivity. Accordingly, some network elements may comprise "multiple services network elements" that provide support for multiple network-based functions (e.g., 360° immersive A/V media preparation delivery policy management, session control, QoS policy enforcement, bandwidth scheduling management, content provider priority policy management, streaming policy management, and the like), in addition to providing support for multiple application services (e.g., data and multimedia applications including 360° immersive video assets (also referred to as 360-degree video assets or simply 360 video assets) in varying qualities or definitions). Example subscriber end stations or client devices may comprise various devices, tethered or untethered, that may consume or deliver media content assets using streaming and/or file-based downloading technologies, which may involve some type of rate adaptation in certain embodiments. Illustrative client devices or UE devices may therefore include any device configured to execute, inter alia, one or more client applications for receiving, recording, storing, and/or decoding/rendering 360 video content, live media and/or static/on-demand media, which may comprise Virtual Reality (VR) media, Augmented Reality (AR) media, Mixed Reality (MR) media, from one or more content providers, e.g., via a broadband access network, using HTTP, HTTPS, RTP, and the like. Accordingly, such client devices may include Next Generation IP-based STBs, networked TVs, personal/digital video recorders (PVR/DVRs), networked media projectors, portable laptops, netbooks, palm tops, tablets, smartphones, multimedia/video phones, mobile/wireless user equipment, portable media players, portable gaming systems or consoles (such as the Wii®, Play Station 3®, etc.) operating in concert with 3D display devices and the like, which may access or consume 360-degree content/services provided via a suitable media distribution network wherein a bandwidth and Quality of Experience (QoE) scheme may be provided in accordance with to one or more embodiments set forth herein.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Skilled artisans will recognize that the foregoing generalized example network environment may be implemented in a hierarchical network architecture, with various aspects of media capture and preparation, including, e.g., source stream stitching, projection mapping, source media compression, tiled/ABR encoding/transcoding, packaging, etc., as well as distributing/uploading and edge node processes taking place in different network portions disposed at different hierarchical levels, involving one or more operators, content delivery networks (CDNs), edge networks, and the like. Further, in some implementations, at least some of the foregoing apparatuses and processes may be cloud-based. In some arrangements, a CDN can be a large distributed system of servers deployed in multiple data centers connected to the Internet or other public/private communications network. A CDN can be a managed or unmanaged network, and can also be a federation of managed or unmanaged networks.

An example embodiment of a media server/source system operatively associated within the foregoing example network environment may therefore be configured, e.g., as a global headend, to accept media content from live sources and/or static file sources, e.g., online content providers such as Hulu®, Netflix®, YouTube®, or Amazon® Prime, as well as VOD catalog or content providers or studios such as, e.g., Disney, Warner, Sony, etc. Media content from live sources may comprise live programming captured relative to any type of event, e.g., sporting/entertainment/gaming events, concerts, live TV shows, live news broadcasting sources, such as, for instance, national broadcasters (e.g., NBC, ABC, etc.) as well as cable broadcaster channels like Time Warner channels of CNN, ESPN, CNBC, etc., and local broadcasters, etc., including any secondary media insertions such as advertisement media channels.

While various embodiments are described herein (and in any appendix), it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for encoding a picture, the method comprising:
    for each picture on either side of the current picture with a distance of one or two away from the current picture, computing a first error value, E, wherein the first error value, E, is computed for each block of a set of blocks of a first block size of the current picture and is based on the respective block of the current picture and a corresponding block in the picture;
    for each picture on either side of the current picture with a distance of one or two away from the current picture, aggregating the first error value, E, over a block of a second block size for each block of the set of blocks of the first block size contained in the block of the second block size to generate a second error value, E', corresponding to the picture;
    computing an importance score for the block of the second block size in the current picture based at least in part on the second error value, E', corresponding to one or more of the pictures on either side of the current picture with a distance of one or two away from the current picture;
    computing a change in quantization parameter, QP, value for the block of the second block size in the current picture based on the importance score; and
    signaling the change in QP value to an encoder.

2. The method of claim 1, wherein computing the first error value, E, is performed during a temporal filtering.

3. The method of claim 1, wherein aggregating the first error value, E, over the block of the second block size for each block of the first block size contained in the block of the second block size to generate a second error value, E', corresponding to the picture comprises averaging the first error value, E, for each block of the first block size contained in the block of the second block size.

4. The method of claim 1, wherein the block of the second block size comprises a coding tree unit, CTU.

5. The method of claim 1, wherein the first error value, E, for a block of the first block size is based on a variance V of the block and a sum-of-squared-differences, SSD, between the block and the corresponding block in the picture.

6. The method of claim 5, wherein the first error value, E, for a block of the first block size is calculated by $$E = a \cdot \frac{SSD+b}{V+c} + \frac{SSD}{d}$$

where a, b, c, and d are parameters.

7. The method of claim 1, further comprising:
aggregating the second error value, E', corresponding to pictures a distance of one away from the current pictures to generate a third error value, E1;
aggregating the second error value, E', corresponding to pictures a distance of two away from the current pictures to generate a fourth error value, E2; and
calculating a fifth error value, E4, based on the third error value, E1, and the fourth error value, E2,
wherein computing an importance score for the block of the second block size in the current picture is based at least in part on the fifth error value, E4.

8. The method of claim 7, wherein aggregating the second error value, E', corresponding to pictures a distance of one away from the current pictures to generate a third error value, E1, comprises averaging the second error value, E', corresponding to pictures a distance of one away from the current pictures to generate a third error value, E1, and wherein aggregating the second error value, E', corresponding to pictures a distance of two away from the current pictures to generate a fourth error value, E2, comprises averaging the second error value, E', corresponding to pictures a distance of two away from the current pictures to generate a fourth error value, E2.

9. The method of claim 7, wherein calculating a fifth error value, E4, based on the second error value, E1, and the fourth error value, E2, comprises computing E4=max(E1,E2)+abs(E2−E1)*A where A is a parameter.

10. The method of claim 7, wherein the fifth error value, E4, is modified based on a layer of the temporal filtering.

11. The method of claim 10, wherein for the highest layer of temporal filtering, the fifth error value, E4, is modified as E4=x*E4+y, where x and y are parameters.

12. The method of claim 1, wherein the change in QP value is one of {−2, −1, 0, +1, +2}.

13. A non-transient computer readable medium comprising instructions which when executed by processing circuitry of an encoder, causes the processing circuitry to:
for each picture on either side of a current picture with a distance of one or two away from the current picture, compute a first error value, E, wherein the first error value, E, is computed for each block of a set of blocks of a first block size of the current picture and is based on the respective block of the current picture and a corresponding block in the picture;
for each picture on either side of the current picture with a distance of one or two away from the current picture, aggregate the first error value, E, over a block of a second block size for each block of the set of blocks of the first block size contained in the block of the second block size to generate a second error value, E', corresponding to the picture;
compute an importance score for the block of the second block size in the current picture based at least in part on the second error value, E', corresponding to one or more of the pictures on either side of the current picture with a distance of one or two away from the current picture;
compute a change in quantization parameter, QP, value for the block of the second block size in the current picture based on the importance score; and
signal the change in QP value to an encoder.

14. The non-transient computer readable medium of claim 13, wherein computing the first error value, E, is performed during a temporal filtering.

15. An encoder, the encoder comprising:
processing circuitry; and
a memory, the memory containing instructions executable by the processing circuitry, whereby the processing circuitry is configured to:
for each picture on either side of a current picture with a distance of one or two away from the current picture, compute a first error value, E, wherein the first error value, E, is computed for each block of a set of blocks of a first block size of the current picture and is based on the respective block of the current picture and a corresponding block in the picture;
for each picture on either side of the current picture with a distance of one or two away from the current picture, aggregate the first error value, E, over a block of a second block size for each block of the set of blocks of the first block size contained in the block of the second block size to generate a second error value, E', corresponding to the picture;
compute an importance score for the block of the second block size in the current picture based at least in part on the second error value, E', corresponding to one or more of the pictures on either side of the current picture with a distance of one or two away from the current picture;
compute a change in quantization parameter, QP, value for the block of the second block size in the current picture based on the importance score; and
signal the change in QP value to an encoder.

16. The encoder of claim 15, wherein computing the first error value, E, is performed during a temporal filtering.

17. The encoder of claim 16, wherein aggregating the first error value, E, over the block of the second block size for each block of the first block size contained in the block of the second block size to generate a second error value, E', corresponding to the picture comprises averaging the first error value, E, for each block of the first block size contained in the block of the second block size.

* * * * *